Patented Oct. 6, 1936

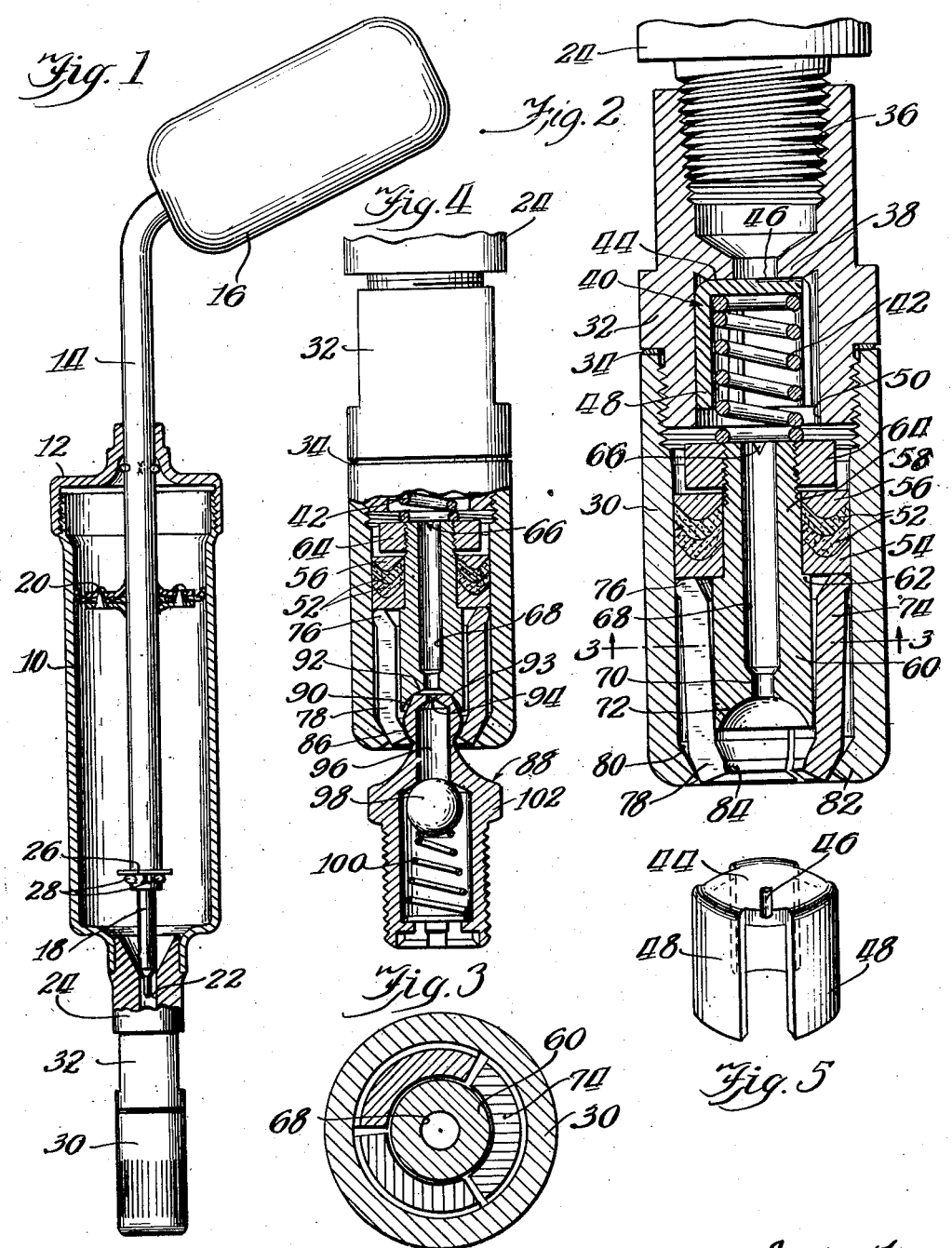
Oct. 6, 1936.   J. BYSTRICKY   2,056,249
LUBRICATING APPARATUS
Filed Jan. 22, 1934
Inventor:
Joseph Bystricky
By Williams, Bradbury, McCaleb & Hinkle, Attys.

2,056,249

UNITED STATES PATENT OFFICE 2,056,249

LUBRICATING APPARATUS

Joseph Bystricky, Chicago, Ill., assignor to Stewart-Warner Corporation, Chicago, Ill., a corporation of Virginia Application January 22, 1934, Serial No. 707,687

5 Claims. (Cl. 285—170)

My invention relates generally to lubricating apparatus, and more particularly to improvements in couplers for high pressure lubricating systems.

It is one of the objects of my invention to provide an improved form of lubricant pressure actuated jaw type coupler which may be coupled to a lubricant receiving fitting merely by a simple thrust motion, and which will be temporarily held upon the fitting by spring pressure.

A further object of my invention is to provide an improved coupler of the above mentioned type which may be conveniently used as a part of a hand operated grease gun.

A further object is to provide an improved form of coupler of the above mentioned type in which improved means are incorporated to check return flow of lubricant from the coupler to the compressor and yet permit gradual release of the lubricant pressure in the coupler.

A further object is to provide an improved form of lubricant pressure actuated jaw type coupler which is of simple construction and may be economically manufactured.

Other objects will appear from the following description, reference being had to the accompanying drawing, in which Fig. 1 is an elevation of my improved coupler attached to a hand operated lubricant compressor, a portion of the latter being illustrated in longitudinal section;

Fig. 2 is an enlarged central longitudinal sectional view of the coupler with the parts in normal position;

Fig. 3 is a transverse sectional view thereof taken on the plane of the line 3—3 of Fig. 2;

Fig. 4 is a transverse sectional view of my improved coupler showing the coupler attached to a lubricant receiving fitting; and Fig. 5 is a perspective view of the check valve.

The coupler of my invention is illustrated as being attached to a hand operated lubricant compressor comprising a barrel 10 having a cap 12 which serves as a guide for a plunger stem 14. A handle 16 is secured to the outer end of the plunger stem and a plunger 18 is secured to or formed integrally with the inner end thereof. An atmospheric pressure operated follower 20 is slidably mounted upon the plunger rod 14 within the barrel 10, serving to feed lubricant under atmospheric pressure into the bore 22 of a high pressure cylinder 24 which is secured in the end of the barrel 10. The plunger stem has a washer 26 thereon to limit downward movement of the follower 20, the washer being held on the plunger stem by a plurality of ears 28 struck from the stem.

The compressor above described is intended to be illustrative of any suitable means for supplying lubricant under pressure, although the coupler of my invention may be applied to this type of compressor with particular advantage.

The coupler, as shown in Fig. 2, comprises a cylinder casing 30 which is threaded to a check valve fitting 32, a gasket 34 of copper or other suitable material being interposed between these parts to insure a lubricant tight joint. The check valve fitting has its other end interiorly threaded as at 36 for securing it to the cylinder part 24 of the lubricant compressor or to any other suitable source of lubricant under pressure. The fitting is provided with a check valve seat 38 intermediate its ends, against which a check valve 40 is normally pressed by a compression coil spring 42.

As shown in Fig. 5, the check valve 40 comprises a disc portion 44 having a narrow shallow groove 46 formed therein, and a plurality of depending skirt portions 48 which guide the check valve for rectilinear movement in a cylindrical bore 50 formed in the check valve fitting 32. A piston composed of a pair of trough-shaped annular leather gaskets 52 held in shape by a pair of complementally formed metallic washers 54, 56 is mounted for limited sliding movement upon the reduced diameter portion 58 of a nozzle 60, the washer 54 normally resting upon an external annular shoulder 62 on the nozzle. A nut 64 is threaded over the upper end of the reduced portion 58 of the nozzle, with its upper surface flush with the end of said portion of the nozzle. As indicated at 66, the nozzle part may be slightly deformed to stake the nut thereto. The nozzle 60 has a passageway 68 extending substantially the length thereof, the passageway being reduced at its outer end to form a small outlet port 70 in the concave spherical contact surface 72 formed at the outer end of the nozzle.

A plurality of jaws 74, here illustrated as three in number, are confined within the cylinder casing 30 and the outer end of the nozzle 60. The inner ends of the jaws 74 are pressed outwardly to form arcuate beads 76 which normally contact against the walls of the cylindrical bore. The outer ends of the jaws 74 have inwardly extending gripping portions 78, the external surfaces of which are conformed to engage a frusto-conical surface 80 formed on an inwardly extending annular projection 82 at the outer end of the cylinder casing 30. The internal edges of the gripping portions 78 of the jaws preferably have concave surfaces 84 conformed for cooperative engagement with the spherical surface 86 formed upon the lubricant receiving fitting 88 with which the coupler is adapted to be connected.

The fitting 88 has a frusto-conical surface 90 which facilitates engagement of the coupler over the fitting, the juncture between this frusto-conical surface and the flat end surface 92 of the fitting forming a relatively sharp circular dirt-cutting edge 93 adapted to make substantially a line contact with the spherically concave seating surface 72 of the nozzle. The fitting is provided with an inlet port 94 of relatively small diameter, the port leading into a passageway 96, the lower end of which is normally closed by a spring pressed ball check valve 98. The fitting is provided with a threaded shank 100 by which it may be secured in the oil hole of a bearing to be lubricated, and has a hexagonal wrench engaging portion 102.

When the lubricant compressor with my improved coupler attached thereto, as shown in Fig. 1, is pressed against a fitting connected to a bearing to which lubricant is to be supplied, the frusto-conical surface 90 of the fitting first engages the gripping portions 78 of the jaws 74 forcing the latter inwardly against the force of the spring 42 until the jaws separate, due to their sliding movement on the frusto-conical surface 80 of the casing cylinder 30, until the opening between them has expanded sufficiently to permit the jaws to pass over the head of the fitting 88. The spring 42 then forces the jaws outwardly relative to the cylinder casing, to the position in which they are shown in Fig. 4. The spring 42 at the same time forces the nozzle 60 outwardly to cause its sealing contact surface 72 to engage with the dirt-cutting edge 93 of the fitting. With the compressor thus initially coupled to the fitting, the plunger stem 14 may be retracted without disconnecting the coupler from the fitting, since the spring 42 holds the jaws in clamping position about the head of the fitting.

The compressor may thus be operated, the downward stroke of the plunger 18 forcing the lubricant contained within the high pressure cylinder 22 to be ejected past the check valve 40 into the upper end of the cylinder casing 30 where the lubricant pressure tends to force the piston 52, 54, 56 outwardly, thereby pressing the jaws 74 more firmly into engagement with the fitting, and at the same time exerting pressure upon the inner end of the nozzle 60 and pressing the latter firmly against the tip of the lubricant receiving fitting. It will be noted that the diameter of the portion 58 of the nozzle is greater than that of the dirt-cutting edge 93 of the fitting. Thus the sealing contact between the spherically concave surface 72 and the dirt-cutting edge 93 of the fitting will be assured at all times.

Upon the retractile stroke of the plunger 18 a partial vacuum will be formed within the cylinder 22, whereupon the follower 20 will, under atmospheric pressure, force an additional charge of lubricant into the high pressure cylinder. At the same time the lubricant in the coupler may leak very slowly through the groove 46 in the face of the check valve and the pressure within the coupler thereby gradually brought to substantially atmospheric pressure. The leakage past the check valve 40 will, however, not be sufficiently rapid materially to interfere with the proper priming of the high pressure cylinder 22. The relief of the pressure within the coupler is of course highly desirable, if not essential, to enable the coupler to be easily disconnected from the lubricant receiving fitting after the completion of the lubricating operation.

The provision of the groove 46 in the face of the check valve is a very simple and advantageous means for accomplishing the desired result. The groove is in such position that clogging thereof will be substantially impossible, since it is purged by the flow of lubricant under high pressure upon each operation of the compressor. The spring 42 serves the dual purpose of holding the check valve 40 against its seat and of forcing the nozzle 58 outwardly, thereby causing the jaws resiliently to be held in clamping engagement with the lubricant receiving fittings during such periods as the lubricant within the coupler is not under pressure.

The spherically concave contact surface 72 is provided so that it is not necessary to maintain the coupler in exact axial alignment with the fitting, a variation of approximately 15° being possible in the construction illustrated, without destroying the effectiveness of the seal between the nozzle and the fitting. The spherically concave surfaces 84 on the jaws likewise permit the coupler to be moved out of axial alignment with the fitting, these spherical surfaces sliding smoothly over the complementary surface of the fitting.

The coupler of my invention has the advantage over the push operated direct contact type of nozzles, as shown for example in the patent to Oscar U. Zerk, No. 1,475,980, in that the area within the dirt cutting contact edge of the fitting does not in any way limit the pressure at which lubricant may be supplied. In other words, the plunger 18 of the compressor may be of any diameter desired to obtain any required pressure, whereas in the aforesaid patent the plunger must be of greater diameter than that of the dirt-cutting edge of the fitting.

While I have shown and described a particular embodiment of my invention, it will be apparent to those skilled in the art that numerous modifications thereof may be made without departing from the principles of my invention set forth in the claims which follow.

I claim:

1. A coupler for high pressure lubricating systems comprising a casing, a plurality of cooperating radially movable jaws slidably mounted in the casing and forming a nipple receiving opening, lubricant pressure operated means for forcing said jaws into locking engagement with a lubricant receiving fitting, an inlet check valve, and a spring pressed between said check valve and said lubricant pressure operated means and operative to hold said check valve against its seat and force said jaws into holding engagement with a lubricant receiving fitting.

2. A check valve for high pressure lubricant couplers comprising a sheet metal stamping having a disc portion of sufficient size to cover the opening in the check valve seat, said disc portion having a shallow groove formed in the seating face thereof, and means formed integrally with said disc portion for guiding said disc portion for rectilinear movement toward and from its seat, said means having a passageway extending therethrough.

3. A check valve for lubricating apparatus comprising an apertured seat, a cylindrical bore at the discharge side of said seat, a check valve disc of greater diameter than the aperture in said seat and located in said bore, said disc having a grove of minute cross sectional area formed in its seating face, apertured means formed integrally with the disc and engageable with the walls of said bore for guiding said disc for rectilinear movement to and from said seat, and a spring for forcing said disc toward said seat.

4. A coupler for high pressure lubricating systems, comprising a body assembly having a cylindrical bore, a piston reciprocable in said bore, fitting engaging jaws operated by said piston, a check valve closing the inlet end of said cylinder, said check valve having a minute groove in its seating face, and a spring operable to hold said check valve closed and to force said piston against said jaws.

5. A coupler comprising, a tubular casing, a plurality of radially movable jaws slidably mounted in said casing and forming a nipple-receiving opening, a longitudinally movable piston disposed interiorly of said jaws and operable to force said jaws into clamping engagement with a nipple upon application of lubricant under pressure to said casing, a check valve for admitting lubricant to said casing, said check valve seating imperfectly to permit slight leakage from said casing, and a spring pressed between said check valve and said piston and operable resiliently to hold said check valve closed and to press said piston against said jaws.

JOSEPH BYSTRICKY.